J. E. SIMPSON & W. D. PUCKETT.
CAR TRUCK.
APPLICATION FILED APR. 2, 1910.
972,581.
Patented Oct. 11, 1910.
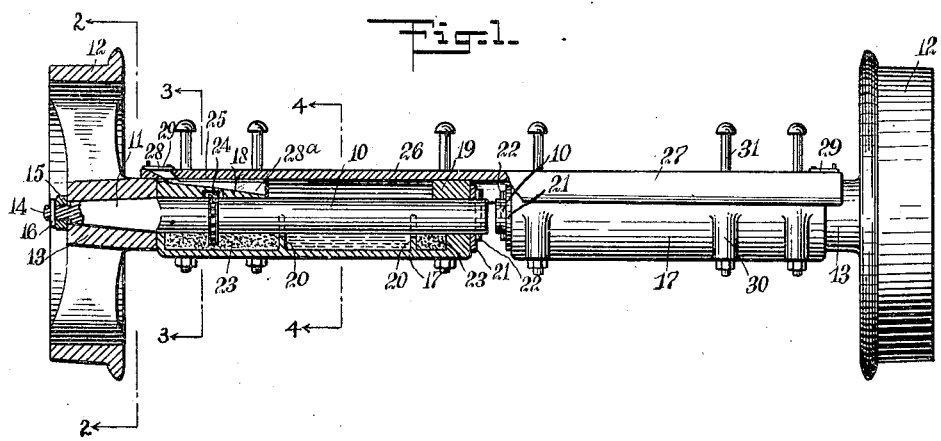
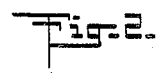
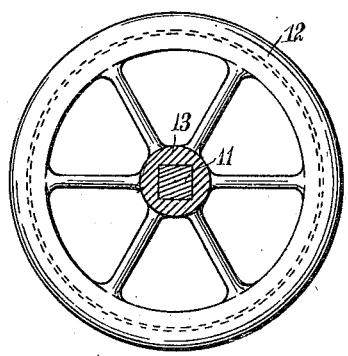
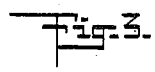
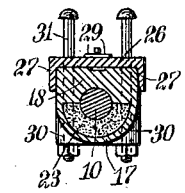
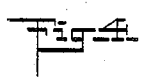
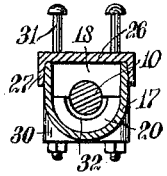
WITNESSES:
INVENTORS
John E. Simpson
William D. Puckett
BY
ATTORNEYS

UNITED STATES PATENT OFFICE.

JOHN E. SIMPSON AND WILLIAM D. PUCKETT, OF PORTSMOUTH, OHIO, ASSIGNORS TO THE PORTSMOUTH MACHINE & CASTING COMPANY, OF PORTSMOUTH, OHIO, A CORPORATION.

CAR-TRUCK.

972,581.  Specification of Letters Patent.  Patented Oct. 11, 1910.

Application filed April 2, 1910. Serial No. 552,944.

*To all whom it may concern:*

Be it known that we, JOHN E. SIMPSON and WILLIAM D. PUCKETT, citizens of the United States, and both residents of Portsmouth, in the county of Scioto and State of Ohio, have invented a new and Improved Car-Truck, of which the following is a full, clear, and exact description.

This invention relates to car trucks for use with railroad and other cars, and has reference more particularly to the combination of independent axle spindles, each having a wheel, bearings for journaling the spindles, and a common member for securing the bearings to a car, the wheel being so designed that no machine work whatever is necessary upon it.

An object of the invention is to provide simple, strong and durable trucks for railroad cars, mining cars and the like, by means of which the expense of manufacturing car wheels can be materially reduced, which are so constructed that they can be easily provided with lubricant, which require very little machining in the process of manufacture, and which can be easily mounted in place under the cars.

A further object of the invention is to provide pairs of wheels which are interchangeable, which can be quickly removed and replaced independently of one another, in which the parts when worn or injured can be easily, quickly and cheaply replaced, and in which liberal bearing surfaces are provided.

A still further object of the invention is to provide a car truck, in which the wheels are positively secured upon the axle spindles, the latter having parts of angular form fitting into, and being secured in, correspondingly shaped hub openings of the wheels, and in which the axle spindles are efficiently lubricated by means of suitable oil reservoirs.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a partial longitudinal section of a pair of wheels constituting an embodiment of our invention and showing the axle spindles and other parts for mounting them in position; Fig. 2 is a transverse section on the line 2—2 of Fig. 1; Fig. 3 is a similar view on the line 3—3 of Fig. 1; and Fig. 4 is a like view on the line 4—4 of Fig. 1.

Before proceeding to a more detailed explanation of our invention, it should be clearly understood that while the wheels are rigidly secured upon the axle spindles they are nevertheless independently revoluble, and conform to the "loose" wheel system, which is distinguished from the "tight" wheel system by the fact that the wheels are independently revoluble. This allows the wheels to turn at different rates of speed in rounding curves, and thereby obviates to a large extent, excessive wear both of the wheels and the track rails, and waste of power. It also eliminates a great deal of the danger of derailment on sharp curves. These advantages of the loose wheel system are well known. A disadvantage is found in the fact that the hubs of the ordinary loose wheels must be fashioned from softer metal than the rims and flanges, to permit the hubs to be suitably machined to fit snugly upon the axle spindles, while the rims must be hard to stand the wear. It has been attempted to overcome these difficulties to a certain extent, by having one wheel loose and one wheel fixed, on the axle. This system, while having certain of the advantages of both of the other systems also includes their disadvantages. In our invention, however, the wheels are rigidly secured upon the axle spindles, and the entire wheel can therefore be fashioned from material of an equal degree of hardness throughout. The axle spindles themselves, as will appear more clearly hereinafter, are journaled. Very little machining is necessary with regard to the axle spindles, as they are a standard product of many mills, and by thus avoiding the machine work, which is nearly all upon the axles and the wheels, the expense of manufacture is materially reduced. Certain of the details of construction form no part of the invention, and can be varied in accordance with individual preference and special conditions, without departing from the underlying spirit of the invention.

Referring more particularly to the drawings, we have shown for example, a pair of axle spindles 10, each of which has at one end a part 11, of angular cross section, and preferably tapered. The wheels 12 have hubs 13, which are formed to receive the ends 11 of the axle spindles. The ends 11 may be given the desired shaft by forcing them into a die. At the extremities, the ends 11 are provided with threaded extensions 14, upon which are located retaining nuts 15 or other suitable holding devices. If desired, cotter pins 16 can be provided, to insure the retention of the nuts in position.

Casings 17, which preferably have the under parts of semi-circular cross section, receive the axle spindles, and have chilled cast bearings 18 and 19 resting upon the axle spindles. These bearings obviate the necessity of using Babbitt metal or brasses. The casings have intermediate their ends, partitions 20, and have the ends closed and provided with circular openings through which the axle spindles project. The partitions 20 have rounded recesses 32 above which the axle spindles are located, as is shown most clearly in Fig. 4. The inner, adjacent ends of the axle spindles have mounted thereon retaining collars 21 held in place by transverse pins 22. The space between the partitions 20 constitutes an oil reservoir. The spaces at the other sides of the partitions are preferably packed with suitable absorbent material 23, such as waste, or felt, which acts to distribute the lubricant along the spindle surfaces which come in contact with the bearings. If so desired, loose chains 24 can be mounted upon the spindles, under the bearings 18, the latter being provided with recesses 25, which receive the chains. These act to carry lubricant to the upper sides of the spindles. The recesses 32 have the edges spaced from the spindles, so that the oil from the reservoir between the partitions can be freely absorbed by the material 23.

A channel member 26 is employed for securing the casings with the axle spindles in place. The channel member has the flanges 27 downwardly disposed to receive therebetween the casings, as is shown most clearly in Figs. 3 and 4. At each end, the channel member has an inlet 28, closed by a suitable cover 29, and communicating with a groove 28ª in the bearing, through which lubricant can be introduced into the oil reservoir of the casings. The latter it will be understood, are substantially dust-proof and fit closely within the channel member. The casings have lugs 30 through which extend substantially vertical openings, and the latter receive bolts 31 which pass through openings of the channel member. They serve to secure the casings to the channel member, and to secure the casings, the axles and the channel member to the car.

Having thus described our invention, we claim as new, and desire to secure by Letters Patent:

1. In combination, independent bearing casings, a spindle journaled in each of said casings, a wheel rigidly mounted upon each of said spindles, a single member recessed at the under side to receive both of said casings, and means for securing said casings and said member together and to a car.

2. In combination, a flanged member adapted to be secured to a car, casings associated therewith between the flanges thereof, separate, independently removable axle spindles journaled in said casings, and wheels mounted upon said spindles at the ends of said member.

3. In combination, a channel member, casings secured to said channel member, between the flanges thereof, said casings having bearings, independent axle spindles journaled in said bearings of said casings, and wheels rigid with said axle spindles.

4. In combination, a member recessed at the under side, and adapted to be secured to a car, casings having spaced bearings at the ends, axle spindles journaled in said bearings, wheels rigidly mounted upon said spindles, and bolts for securing said casings and said member together and to a car, said casings being open at the top, and being received in said recessed member.

5. In combination, a channel member, casings mounted between the flanges thereof and having bearings; said casings constituting lubricant reservoirs, axle spindles journaled in said bearings and projecting at the outer ends of said casings, wheels rigidly mounted upon said projecting ends of said spindles, and bolts for securing said casings and said channel member together and to a car.

6. In combination, a channel member, casings mounted between the flanges thereof and having bearings, axle spindles mounted in said casings, under said bearings, and projecting at the outer ends of said casings, and wheels rigidly mounted upon said projecting ends of said spindles, said casings having partitions and constituting lubricant reservoirs, said channel member having inlets for the introduction of lubricant into said casing reservoirs.

7. In combination, a channel member, casings mounted under said channel member between the flanges thereof, and having bearings adjacent to said channel member, axle spindles mounted in said casings, under said bearings, and projecting at the outer ends of said casings, wheels rigidly mounted upon said projecting ends of said spindles, and bolts for securing said casings and said channel member together and to a car, said casings having partitions therein dividing said casings into lubricant reservoirs and chambers for absorbent material, said channel member having inlet openings for the introduction of lubricant into said casing reservoirs.

8. In combination, a channel member, casings open at the top, and having at the ends spaced bearings, said casings being mounted under said channel member, between the flanges thereof, axle spindles mounted under said bearings in said casings, and projecting at the outer ends of said casings, wheels rigidly mounted upon said projecting ends of said spindles, and bolts for securing said casings and said channel member together and to a car, said casings having partitions therein dividing said casings into lubricant reservoirs and chambers for absorbent material, said channel member at the ends having inlet openings for the introduction of lubricant into said casing reservoirs said outer bearings having grooves for directing the lubricant from said openings into said reservoirs.

9. In combination, a casing having a bearing, an axle spindle journaled in said casing under said bearing, said casing having the bottom spaced below said spindle and a wheel rigidly mounted upon said spindle, said casing having partitions intermediate the ends thereof and extending upwardly toward said spindle, said partitions forming a lubricant reservoir, said casing having absorbent material therein under said spindle, at opposite sides of said lubricant reservoir.

In testimony whereof we have signed our names to this specification in the presence of two subscribing witnesses.

JOHN E. SIMPSON.
WILLIAM D. PUCKETT.

Witnesses:
LAWRENCE J. WAGNER,
OSCAR W. NEWMAN.